United States Patent [19]

Sugihara

[11] 4,219,890
[45] Aug. 26, 1980

[54] DIGITAL SIGNAL REGULATION SYSTEM

[75] Inventor: Yasumasa Sugihara, Kawasaki, Japan

[73] Assignee: The General Corporation, Kanagawa, Japan

[21] Appl. No.: 921,178

[22] Filed: Jul. 3, 1978

[30] Foreign Application Priority Data

Jul. 1, 1977 [JP] Japan .................................. 52-79246

[51] Int. Cl.² ........................................... H04L 27/08
[52] U.S. Cl. ..................................... 375/98; 329/106; 307/264; 375/22
[58] Field of Search ........................ 329/104, 106, 109; 332/9 R, 11 R, 17; 325/39, 40, 38 A, 139, 142, 321, 326; 178/68, 88; 179/15 A, 15 BM, 15 AW; 330/207 A, 251, 278, 151; 307/234, 264, 265

[56] References Cited

U.S. PATENT DOCUMENTS

| | | | |
|---|---|---|---|
| 3,406,343 | 10/1968 | Mehlman | 325/40 |
| 3,505,609 | 4/1970 | Varsos et al. | 179/15 AW |
| 3,980,826 | 9/1976 | Widmer | 178/68 |

Primary Examiner—Benedict V. Safourek

Attorney, Agent, or Firm—Robert E. Burns; Emmanuel J. Lobato; Bruce L. Adams

[57] ABSTRACT

A system is disclosed for regulating a digital signal which is modulated such that an average of their amplitude over a given interval varies from interval to interval, in a manner to maintain the average constant. The digital signal comprises a train of pulses formed by pulse tops and pulse bottoms both of which are equally spaced from a reference level and at least one of the pulse top and pulse bottom being greater than two pulse widths. Signals which are modulated in accordance with MFM, RZ and NRZ systems correspond to such a digital signal. In accordance with the invention, those pulse tops or the pulse bottoms of the digital signal which have a selected one of the pulse widths are maintained unchanged in amplitude from its original value while other pulse tops or bottoms having different pulse widths are compressed in inverse proportion to their respective pulse widths. The system of the invention produces correction pulses for algebraic addition to those portions having the different pulse widths. The correction pulses have pulse widths which are equal to those of said other pulse tops or bottoms and have an amplitude which is determined in accordance with the pulse width thereof.

7 Claims, 12 Drawing Figures

DIGITAL SIGNAL REGULATION SYSTEM

FIELD OF THE INVENTION

The invention relates to a digital signal regulation system, and more particularly, to a system for regulating the average of the amplitudes of a modulated digital signal within a particular time interval.

DESCRIPTION OF THE PRIOR ART

In the transmission or recording of a digital signal, it is conventional to use such data in modulated form. Various modulation systems are known including a return-to-zero (RZ) system, non-return-to-zero (NRZ) system, non-return-to-zero inverted (NRZI) system, frequency modulation (FM) system, modified frequency modulation (MFM) system and phase modulation (PM) system. All of these systems are well known in the art and therefore will not be described in detail. Some of them are advantageous while the others are disdvantageous in respect of the self-clocking capability, recording density, occupied frequency band, and peak detection capability. In a usual transmission system having a reduced passband or in a recording and reproducing system, it often occurs that a certain modulation system is preferred in many respects while it suffers from an increased frequency band which is necessary for the resulting digital signal. This applies to a modulation system in which an average of the amplitudes of the modulated digital signal within a specified time interval constantly varies in accordance with the data value. If such a modulation system is employed, an increased passband must be allowed in the low frequency region of the system since otherwise the upper and lower levels of the pulses in the output pulse train will be misaligned from each other, presenting difficulty in assuring a reliable operation of the utilization apparatus.

Figure 1:
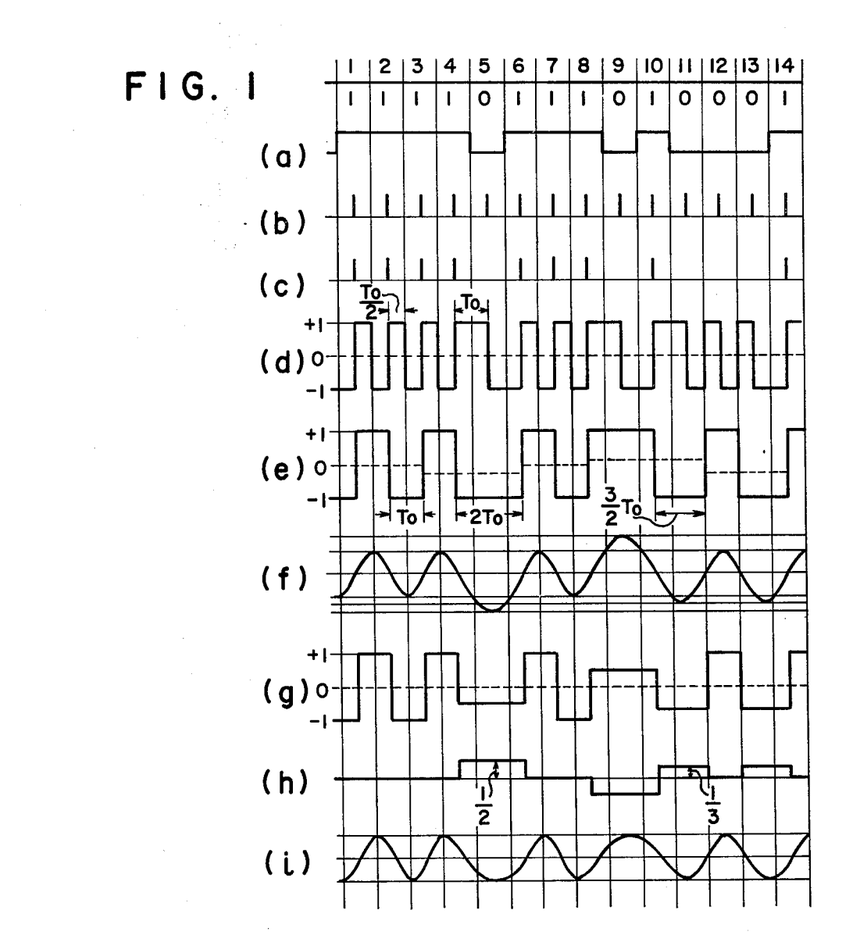
FIG. 1 shows a series of waveforms for describing the background of the invention.

Among known modulation systems, only the PM system assures a nearly constant average of the amplitudes of the digital signal. Referring to FIG. 1 for a more detailed discussion of this aspect, it will be seen that when a clock frequency is represented by $f_0$, it is related to the period $T_0$ by the relation $f_0 1/T_0$. FIG. 1($d$) represents the waveform which is obtained by a phase modulation of data shown in FIG. 1($a$). FIG. 1($b$) shows clock pulses and FIG. 1($c$) information bit pulses. With the phase modulation, the resulting digital signal will have a rising end or leading edge for binary "1" and a falling end or trailing edge for binary "0". A signal may be represented in terms of one of the types of bi-level pulses varying between $+1$ and $0$, $-1$ and $0$, or $+1$ and $-1$. In the description to follow, the digital signal will be conveniently represented by a bi-level pulse varying between $+1$ and $-1$ levels. In the general description, the portion of the signal which corresponds to a pulse of a positive polarity will be referred to as "the top of pulse" or "pulse top" while another portion corresponding to a pulse of a negative polarity will be referred to as "the bottom of pulse" or "pulse bottom". It well be appreciated that for a digital signal represented by a bi-level pulse varying between $+1$ and $0$, the width of "the top of pulse" corresponds to a usual pulse width while the width of "the bottom of pulse" corresponds to a spacing between pulses, and that for a signal represented by a bi-level pulses varying between $-1$ and $0$, they correspond to the pulse spacing and the pulse width, respectively.

Referring to FIG. 1($d$), both the top and the bottom of the pulses include components having pulse widths $\frac{1}{2}T_0$ and $T_0$ where $T_0$ represents the period of the clock pulse. During the time interval from the first bit cell to the middle of the tenth bit cell of the signal, adjacent pulse tops and pulse bottoms have an equal pulse width and have an equal amplitude as referenced to the zero level, so that an average of the amplitudes remains constant as considered from the beginning of one pulse to the beginning the next pulse of either polarity. During the time interval from the middle of the tenth bit cell to the middle of the fourteenth bit cell, adjacent pulse tops and pulse bottoms have different pulse widths at the beginning and the end of such interval, so that a pulse-to-pulse average of the amplitudes varies. However, since the variation is equal in magnitude and opposite in polarity, the average over the entire interval can be regarded as substantially constant. As a consequence, if the phase modulated digital signal is used, the lower limit frequency in the passband characteristic of the system can be chosen close to $\frac{1}{2}f_0$. However, if the upper frequency of the passband is fixed, the recording density according to the phase modulation system is reduced to nearly one-half that of MFM system. The recording density represents a significant factor in the choice of the modulation system, and therefore it will be seen that MFM system is more advantageous over the PM system in this respect.

Considering now the average of amplitudes when MFM system is employed, the resulting signal is shown in FIG. 1($e$). As shown, a reversal of polarity occurs for binary "1", and no reversal of polarity occurs for binary "0" which appears alone. However, the polarity reversal occurs at the boundary between the bit cells if more than one binary "0"s follow in succession. It will be seen that this signal includes three kinds of pulse tops and pulse bottoms each having different pulse widths of $T_0$, $3/2T_0$ and $2T_0$. (It is to be noted that the pulse top having a width of $3/2T_0$ is not shown in FIG. 1($e$).) Consequently, an average of amplitudes of the signal over a given time interval will vary as indicated by dotted lines. This is due to the fact that pulse tops and pulse bottoms having different pulse widths have an equal amplitude or are equally spaced from the zero level. During a time interval from the third bit cell to the eleventh bit cell of FIG. 1($e$), it is noted that the signal includes a component having a low frequency of nearly $1/8.5f_0$. Consequently, when this modulation system is employed, the lower limit of the passband of the associated system must be sufficiently low.

Known modulation systems other than the PM system suffer from the same disadvantages as MFM system mentioned above, as will be readily apparent from a similar analysis of the signal waveform resulting from these modulation systems.

Figure 7:
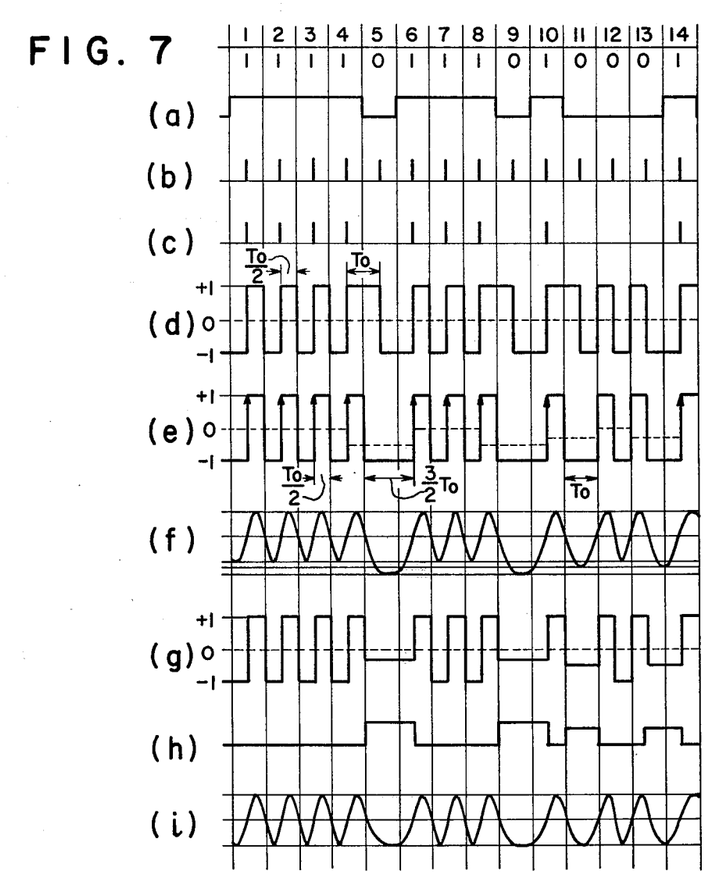
FIG. 7 shows a series of waveforms for illustrating the background of the invention.

In U.S. Pat. application Ser. No. 903,695 filed May 8, 1978, the inventor has proposed a novel modulation system which can be used with a record medium of a specified kind which suffers from certain difficulties in recording a digital signal modulated in accordance with the known modulation systems. The novel modulation system is preferred for use with a medium as disclosed in West Germany Laid-Open Specification No. 2,024,539 in which a signal is stored in the form of a mechanically deformable surface area. An exemplary waveform of the digital signal which is modulated in accordance with such modulation scheme is illustrated in FIG. 7($e$) of this application. As will be evident by comparison of this signal with the phase modulated signal shown in FIG. 7(d), there is a rising end for binary "1" in the similar manner as in the phase modulation scheme, but the pulse representation for binary "0" is different. Specifically, there occurs no change in the pulse for binary "0" which appears alone, and when more than one binary "0"s follow in succession, a pseudo pulse or pulses having a spacing which is an odd multiple of ½T$_0$ relative to adjacent pulses are inserted. In this Figure, a pulse indicative of binary "1" is represented by an arrow while pulses without such arrow represent pseudo pulses. This novel modulation scheme will be referred to as a modified phase modulation scheme (MPM). According to this scheme, the width of each pulse top is constant and is equal to ½T$_0$ while the spacing between the adjacent pulse tops or the width of the pulse bottom has three different values of ½T$_0$, T$_0$ and 3/2T$_0$. This relationship between the pulse tops and the pulse bottoms may be reversed by choosing opposite polarities. It will be seen that this MPM scheme still fails to provide a solution to the problem of a varying average of amplitudes.

From the above description, it will be understood that a digital signal having pulse tops and pulse bottoms, at least one of which has three different pulse widths, inherently exhibits a variation in the average of amplitudes.

SUMMARY OF THE INVENTION

It is an object of the invention to provide a system which regulates an average of amplitudes of a modulated digital signal within a given time interval to coincide with a reference value.

It is another object of the invention to provide a system which achieves the above object with a simple arrangement.

In accordance with the invention, there is provided a digital signal regulation system in which binary data is represented by a train of pulses formed by pulse tops and pulse bottoms which are equally spaced by a given amplitude from a reference level and wherein at least one of the pulse tops and pulse bottoms are of more than two different pulse widths, characterized in that either the pulse top or the pulse bottom which has a selected one of different pulse widths has its amplitude maintained unchanged as a reference while other pulse tops or pulse bottoms having different pulse widths have their amplitude regulated relative to the reference amplitude.

In a preferred embodiment of the invention as applied to a MFM system in which both pulse tops and pulse bottoms are of three different pulse widths of T$_0$, 3/2T$_0$ and 2T$_0$, respectively, each of that pulse top and pulse bottom which has the smallest pulse width T$_0$ has its amplitude chosen as a reference. The amplitude of other pulse tops and pulse bottoms which have pulse widths of 3/2T$_0$ and 2T$_0$ are regulated relative to the reference. The regulation occurs in a manner such that the pulse top or the pulse bottom which has a pulse width of 3/2T$_0$ has its amplitude compressed into ⅔ times the original amplitude while the pulse top or the pulse bottom which has a pulse width of 2T$_0$ has its amplitude compressed into ½ times its original value, whereby an average of amplitudes of the signal can be theoretically maintained constant. Alternatively, the amplitude of the pulse top or the pulse bottom having the longest pulse width 2T$_0$ may be chosen as a reference. In this instance, the pulse top or the pulse bottom which has a pulse width of 3/2T$_0$ has its amplitude expanded into 4/3 times its original value while the pulse top or the pulse bottom having a pulse width of T$_0$ has its amplitude expanded into twice its original value. The compression or expansion of the amplitude may occur relative to the zero level for a bi-level pulse varying between +1 and −1, or relative to a predetermined level for a bi-level pulse varying between +1 and 0 or −1 and 0. The regulation of the amplitude preferably occurs for all pulse tops or bottoms having different pulse widths from a pulse width of a given pulse top or bottom which is chosen as a reference. However, the regulation may be applied to only selected other pulses. By way of example, the regulation may be applied to pulse tops or bottoms having selected pulse widths where both the pulse top and the pulse bottom are of more than two different pulse widths as occur in the NRZ system. On the other hand, for a signal produced by a MPM system, the pulse tops are uniform in width, so that it is only necessary to regulate the amplitude of the pulse bottoms. The same is true of a signal produced by a RZ system.

With the present invention, an average of amplitudes of a digital signal can be regulated to maintain a substantially constant value, with the consequence that the low frequency range of the passband may be very much limited. By way of example, the lower limit frequency of the passband may be ¼f$_0$ in the MFM system and ½f$_0$ in the MPM system, allowing a superposition of another signal in a low frequency range outside the band. When the modulated digital signal formed according to the invention is passed through a low pass filter having a limited passband, no misalignment between the amplitudes of the output waveform occurs as it occurs in a prior art arrangement.

DESCRIPTION OF PREFERRED EMBODIMENTS

Specific embodiments of the invention as applied to MFM and MPM systems will be described below. In the modified frequency modulation (MFM), the pulse width is limited to three values, namely, T$_0$, 3/2T$_0$ and 2T$_0$. Hence, a pulse having a width T$_0$ may be chosen as a reference and the intended object can be achieved by detecting the pulse width of individual pulses of either positive or negative polarity, and producing a correction pulse of the opposite polarity and of the same pulse width for each pulse having a pulse width of either $3/2T_0$ and $2T_0$ for algebraic addition to the original signal. If the average is chosen equal to zero, the amplitude of each correction pulse will be one-third of the original signal for a pulse having a width $3/2T_0$ and will be one-half of the original signal for a pulse having a width $2T_0$, as referenced to "0" level of the original signal, as shown in FIG. 1(h).

In order to discriminate pulses as to whether they have any one of the pulse widths of $T_0$, $3/2T_0$ or $2T_0$, a pulse of positive polarity is chosen to produce separate pulses indicative of the rising end and the falling end thereof, respectively. A first falling end pulse which occurs after each rising end pulse is applied to gate circuits together with gate pulses having predetermined widths corresponding to the pulse width of $T_0$, $3/2T_0$ or $2T_0$. In a similar manner, the pulse widths for a pulse of a negative polarity can be discriminated.

Figure 2A:
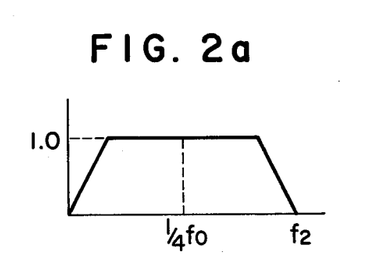
FIGS. 2a and 2b show the passband responses of a system to which the invention is applied.
Figure 2B:
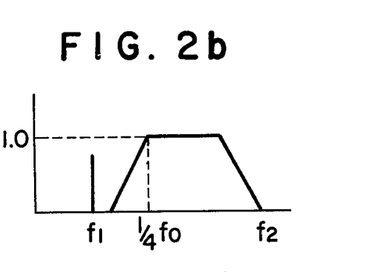

FIG. 1(g) shows a pulse waveform which has been subjected to the level regulation in the manner mentioned above. As shown, the signal has a constant average value indicated by dotted lines, so that the modulation of any data contains little low frequency components which are below $f_0/4$ and hence the lower limit of the passband can be increased to the vicinity of $f_0/4$. This is illustrated by FIGS. 2(a) and 2(b) which show the passband characteristic of the modulated wave according to the usual MFM system and the level regulated wave according to the invention, respectively. In FIG. 2(a), there must be a broad low frequency region, preferably including d.c. components. However, in the arrangement of the invention illustrated in FIG. 2(b), the characteristic is nearly flat down to $\frac{1}{4}f_0$, and the lower frequencies can be cut-off in a suitable manner. Thus, the invention permits the passband to be narrowed, facilitating the design of an apparatus. As indicated at $f_1$ in FIG. 2(b), in accordance with the invention, a separate, independent signal may be multiplexed in a range below the passband.

Considering now the high frequency range of the passband, it is generally desirable to provide as broad a high frequency range as possible since a digital signal is formed of square waves and hence include a number of higher harmonic components. However, the economical consideration and the requirement for the response usually determine the bandwidth. Assuming that a usual MFM modulated wave as shown in FIG. 1(e) is passed through a square law, sinusoidal wave low pass filter having a cut-off frequency $f_2$ which is chosen equal to $2/3f_0$, there results an output waveform as shown in FIG. 1(f). As shown, the output has a varying amplitude depending on the different pulse widths $T_0$, $3/2T_0$ and $2T_0$ in the original signal. Such level variation may be undesirable in a certain arrangement. However, such drawback can be avoided by the use of the present invention. Specifically, a design can be made such that the level of pulses having pulse widths $3/2T_0$ and $2T_0$ may be automatically regulated in accordance with the characteristic of the low pass filter, whereby a substantially constant amplitude may be achieved for the individual pulses as illustrated in FIG. 1(i). The regulation of the amplitude may take place after the passage through the filter. In this instance, the amplitude of the correction pulse need not be limited to $\frac{1}{3}$ for a pulse having a pulse width $3/2T_0$ and to $\frac{1}{2}$ for a pulse having a pulse width $2T_0$ as mentioned previously. Rather it can be freely chosen. However, there is no assurance that the average be maintined constant. By a more sophisticated design to adjust the cut-off frequency and the attenuation response of the low pass filter, it is possible to maintain the average substantially constant and at the same time to maintain the amplitude of individual pulses substantially constant after passage through the filter.

Figure 3:
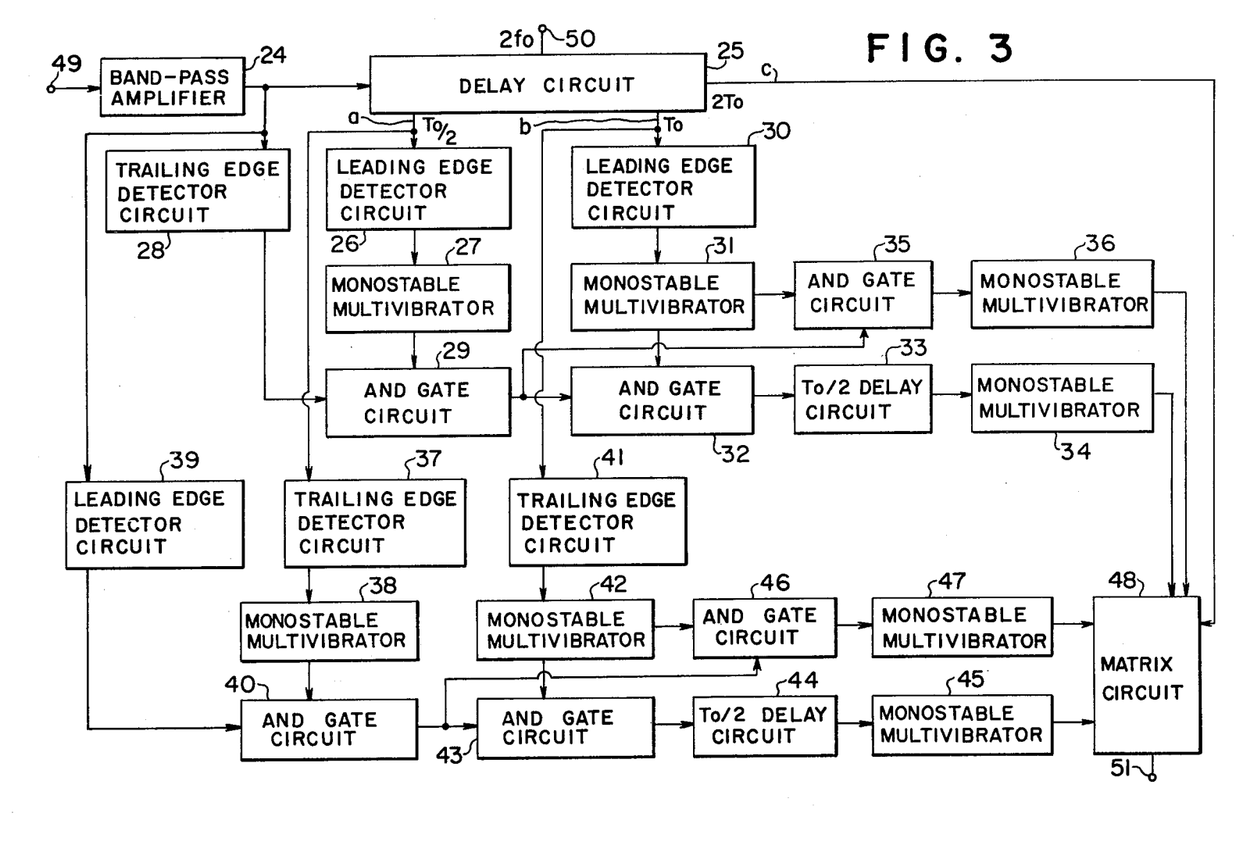
FIG. 3 is a block diagram of an apparatus according to the invention as applied to the modulation of a signal according to the MFM system.
Figure 4:
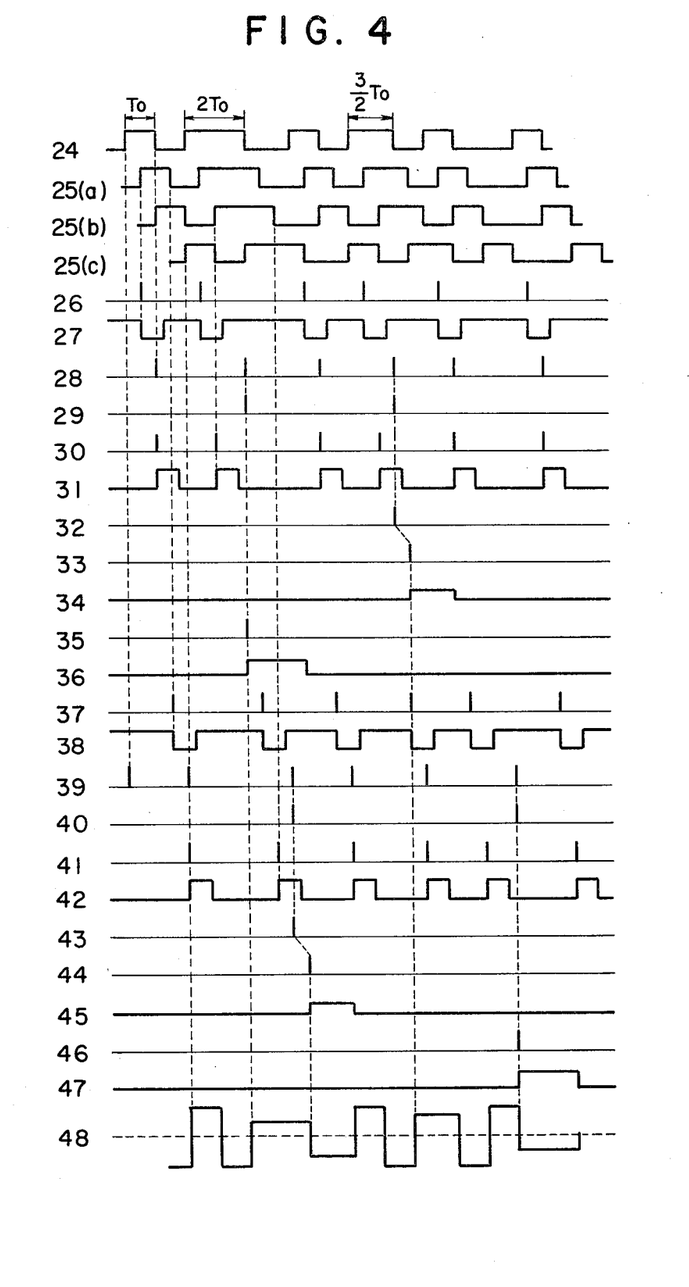
FIG. 4 shows a series of waveforms of various signals appearing in the apparatus shown in FIG. 3.

Referring to FIG. 3, there is shown an apparatus which incorporates the concept of the invention described above. The waveform of signals appearing at the output of various components which constitute together the apparatus is shown in FIG. 4 and designated by the same reference numerals as used in FIG. 3.

An MFM modulated wave is applied to input terminal 49 and thence fed to bandpass amplifier 24 which eliminates noise components. Subsequently, it is applied to a delay circuit 25, a falling or trailing end detector 28 and a rising end detector 39. Delay circuit 25 provides corresponding signals which are delayed by $\frac{1}{2}T_0$, $T_0$ and $2T_0$ on lines a, b and c, respectively. Circuit 25 comprises a shift register and has a terminal 50 to which a shift pulse having a frequency of $2f_0$ is applied, $f_0$ being the clock frequency. In the following, the generation of a correction pulse for a pulse of positive polarity which is contained in the original signal will be mentioned initially, followed by the description of the generation of a correction pulse for a pulse of negative polarity. Signal 25a (FIG. 4) which is delayed by $\frac{1}{2}T_0$ is applied to a rising end detector 26, which includes a differentiator and a pulse shaping circuit to produce a pulse indicative of the rising end thereof. This pulse triggers a monostable multivibrator 27, which produces a gate pulse having a pulse width of about $\frac{3}{4}T_0$. The signal leaving the bandpass amplifier 24 is applied to the falling end detector 28, which produces a pulse indicative of the falling end in the similar manner as the detector 26. The gate pulse and the pulse indicative of the falling end is applied to AND gate 29, thereby producing pulse 29 shown in FIG. 4. This pulse represents a train of pulses 28 (see FIG. 4) indicative of the falling end and containing information representing the position of the falling end of pulses of a positive polarity contained in the original signal and from which those pulses containing such information concerning pulses of the pulse width $T_0$ are eliminated, and thus contain pulse position information concerning pulses having pulse widths $3/2T_0$ and $2T_0$.

The discrimination between the pulse widths $3/2T_0$ and $2T_0$ is performed by the circuit portion including a rising end detector 30, monostable multivibrator 31, delay circuit 33 and gates 32, 35. It will be appreciated that the operation of this circuit portion is similar to that of the circuit elements 26 to 29 except that the timing of their operation is delayed by $\frac{1}{2}T_0$. The signal 25b (see FIG. 4) which is delayed by $\frac{1}{2}T_0$ from the signal 25a or delayed by $T_0$ from the original signal is applied to the rising end detector 30, which produces a pulse indicative of the rising end in the similar manner as the detector 26. This pulse triggers the monostable multivibrator 31, which produces a gate pulse having a pulse width of $\frac{3}{4}T_0$. The gate pulse and the output pulse from gate 29 are both applied to AND gate 32, which then develops an output pulse containing pulse position information of a pulse having the pulse width $3/2T_0$. In order to adjust the timing when the correction pulse is algebraically added to the pulses in the original signal, this output pulse is further delayed by $\frac{1}{2}T_0$ by delay circuit 33, and the delayed pulse triggers a monostable multivibrator 34, which then produces a correction pulse having a pulse width of $3/2T_0$.

On the other hand, in order to separate a pulse containing pulse position information of a pulse having a pulse width $2T_0$, the output pulse from gate 29 and an inverted output pulse from monostable multivibrator 31 are applied to AND gate 35, which then produces a pulse containing pulse position information of a pulse having a pulse width $2T_0$. Since there is no need to adjust the timing for this pulse, the latter directly triggers a monostable multivibrator 36, which then produces a correction pulse having a pulse width of $2T_0$.

Correction pulses for a pulse of a negative polarity contained in the original signal can be produced in the similar manner. A rising end detector 39 produces a pulse indicative of a rising end in the similar manner as the falling end detector 28 has produced a pulse indicative of the falling end of a pulse contained in the original signal. Similarly, a falling end detector 37, 41 produces a pulse indicative of a falling end in the similar manner as the rising end detector 26, 30 produce a pulse indicative of the rising end of a delayed pulse in the original signal. Monostable multivibrators 38, 42 correspond to multivibrators 27, 31 described above, and produce gate pulses, respectively, which are passed through gates 40, 43, $\frac{1}{2}T_0$ delay circuit 44 and monostable multivibrator 45, which correspond to gates 29, 32, delay 33 and multivibrator 34, respectively, thus producing a correction pulse having a width $3/2T_0$. The operation of these circuit elements will be apparent by reference to associated waveforms shown in FIG. 4.

The combination of gate 46 and monostable multivibrator 47, which correspond to gate 35 and multivibrator 36, respectively, provides a correction pulse having a width of $2T_0$.

The correction pulses thus produced are applied to matrix circuit 48 with suitable polarities for algebraic addition to associated pulses contained in the original signal which is delayed by $2T_0$ and supplied from delay circuit 25 through the line c. The choice of the amplitude of the individual correction pulses is a matter of design. The polarity and the amplitude of individual correction pulses 34, 36, 45 and 47 are chosen to provide a constant average as indicated in broken lines 48 in FIG. 4.

Figure 5:
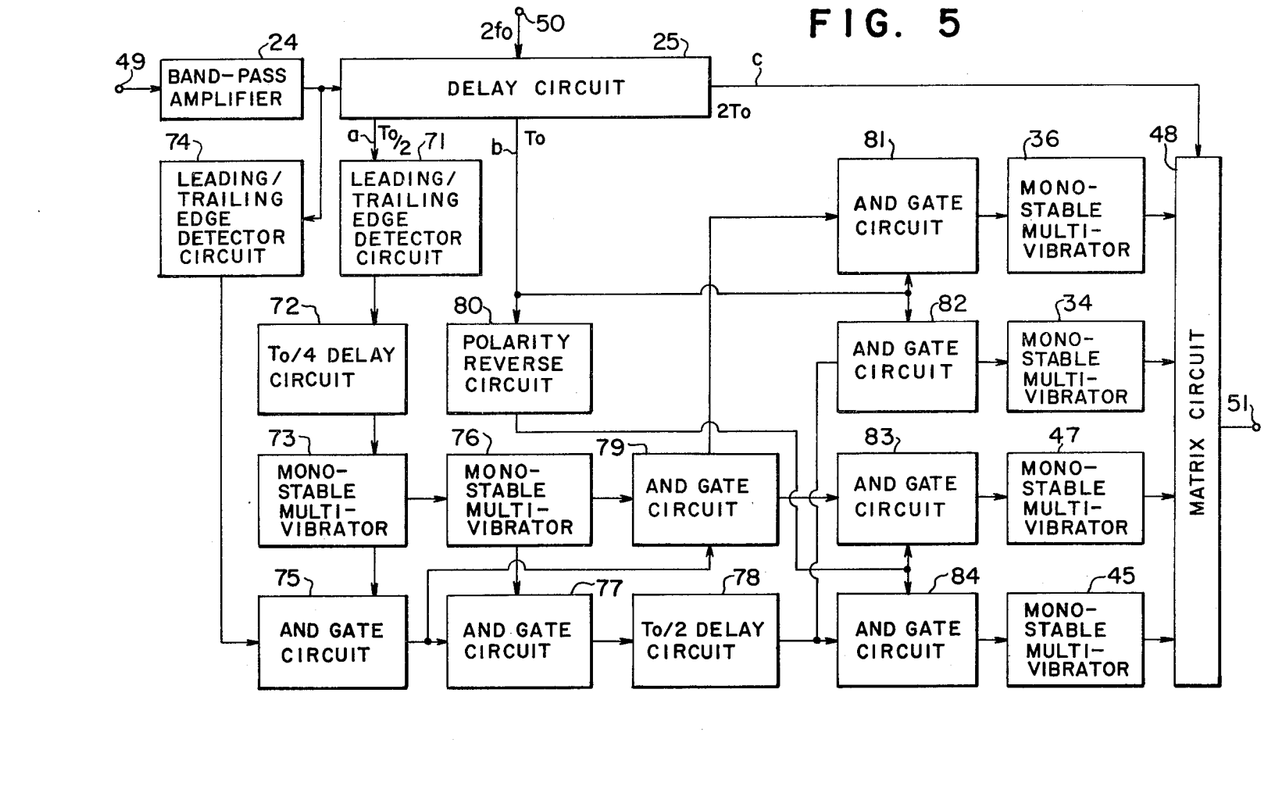
FIG. 5 is a block diagram of a modification of the apparatus shown in FIG. 3.
Figure 6:
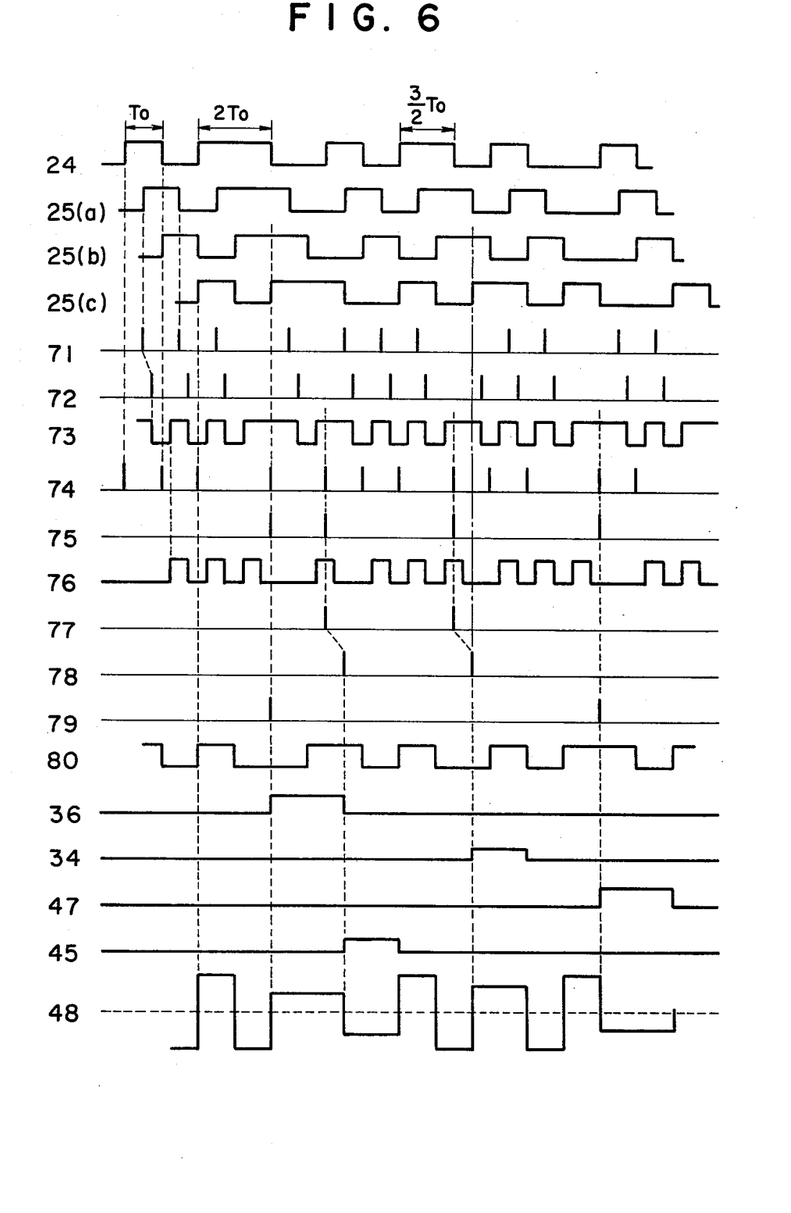
FIG. 6 shows a series of waveforms of various signals appearing in the apparatus of FIG. 5.

In the apparatus described above, the positive and negative pulses contained in the original signal has been separately dealt with in order to achieve a discrimination between the pulse widths of $3/2T_0$ and $2T_0$. However, a different arrangement is contemplated which provides a discrimination between pulse widths $3/2T_0$ and $2T_0$ for both positive and negative pulses and which determines the polarity subsequently. Such a modification will now be described with reference to FIGS. 5 and 6. It should be understood that corresponding parts are designated by like reference characters, and that the waveform of signals appearing at the output of individual circuit elements shown in FIG. 5 are illustrated in FIG. 6 and designated by corresponding reference characters.

Delay circuit 25 provides a signal which is delayed by $\frac{1}{2}T_0$ and which is applied to a rising end and falling end pulse generator 71, the output pulse of which is further delayed by about $\frac{1}{4}T_0$ by delay circuit 72. The delayed pulse is applied to a monostable multivibrator 73, thus producing a gate pulse having a pulse width of $\frac{1}{2}T_0$. On the other hand, the original signal is applied to a rising end and falling end pulse generator 74, the output pulse of which is applied to AND gate 75 together with the gate pulse. As a result, there is separated a pulse 75 shown in FIG. 6 which contain pulse position information of pulses having pulse widths of $3/2T_0$ and $2T_0$ for both positive and negative pulses. Output of monostable multivibrator 73 is fed to a monostable multivibrator 76 which is triggered by the rising end pulse thereof, thus producing a gate pulse having a pulse width of $\frac{1}{2}T_0$. This gate pulse is applied to AND gate 77 together with the output pulse from gate 75, thus producing a pulse containing pulse position information of a pulse having a pulse width of $3/2T_0$. This pulse is further delayed by $\frac{1}{2}T_0$ by delay circuit 78, and the delayed pulse is applied to AND gate 82 together with the original signal from delay circuit 25 which is delayed by $T_0$, thus producing a pulse having pulse position information of a pulse having a pulse width of $3/2T_0$ for the positive polarity. The original signal from the delay circuit 25 which is delayed by $T_0$ is also fed to polarity inversion circuit 80, where it is converted into a signal of opposite polarity, which is then applied to AND gate 84 together with the output from delay circuit 78. As a consequence, a pulse is produced containing pulse position information of a pulse having a pulse width of $3/2T_0$ for the negative polarity.

A gate pulse formed by the phase reversal of the output of gate 76 and the output pulse of gate 75 are applied to AND gate 79, which produces a pulse containing pulse position information of a pulse having a pulse width of $2T_0$ for both the positive and the negtive polarity. Processing in the similar manner as with the pulse width $3/2T_0$, gates 81 and 83 produce pulses containing pulse position information of pulses having a pulse width of $2T_0$ for the positive and the negative polarity, respectively.

The outputs of gates 81, 82, 83 and 84 are fed to their associated monostable multivibrators 34, 36, 45 and 47, respectively, which produce correction pulses in the same manner as the apparatus shown in FIG. 3 and apply them to matrix circuit 48 together with the original signal from delay circuit 25 which is delayed by $2T_0$.

Figure 8A:
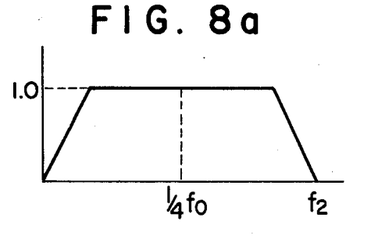
FIGS. 8a and 8b show the passband characteristic of another system to which the invention is applied.
Figure 8B:
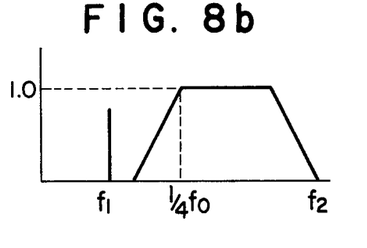

FIG. 7 illustrates the waveforms similar to those shown in FIG. 1, but which are obtained when the concept of the invention is applied to a signal modulated according to the MPM scheme. In this Figure, the waveform (e) represents the waveform of a signal which represents the modified phase modulation of data shown by the waveform (a). The waveform (f) represents the result of passing the signal (e) through a square law, sinusoidal filter having a cut-off frequency of $2f_0$. The waveform (g) shows the pulse (e) algebraically added with correction pulses shown by the waveform (h) while the waveform (i) represents the signal waveform after passing the signal (g) through the filter. This Figure also shows clock pulse (a), information bit pulse (b) and phase modulated signal (d) for purpose of reference. When the invention is applied to a signal modulated according to the MPM scheme, the average of amplitudes remains constant as indicated by dotted lines in FIG. 7(g), so that the lower limit frequency of the passband can be held high. Referring to FIG. 8(b), there is shown the passband which is available in accordance with the invention. As will be evident from a comparison with FIG. 8(a) which indicates the passband response for the signal shown in FIG. 7(e), the lower limit frequency can be established at about $\frac{1}{2}f_0$. As a consequence, a separate signal $f_1$ can be introduced in the empty low frequency range.

Figure 9:
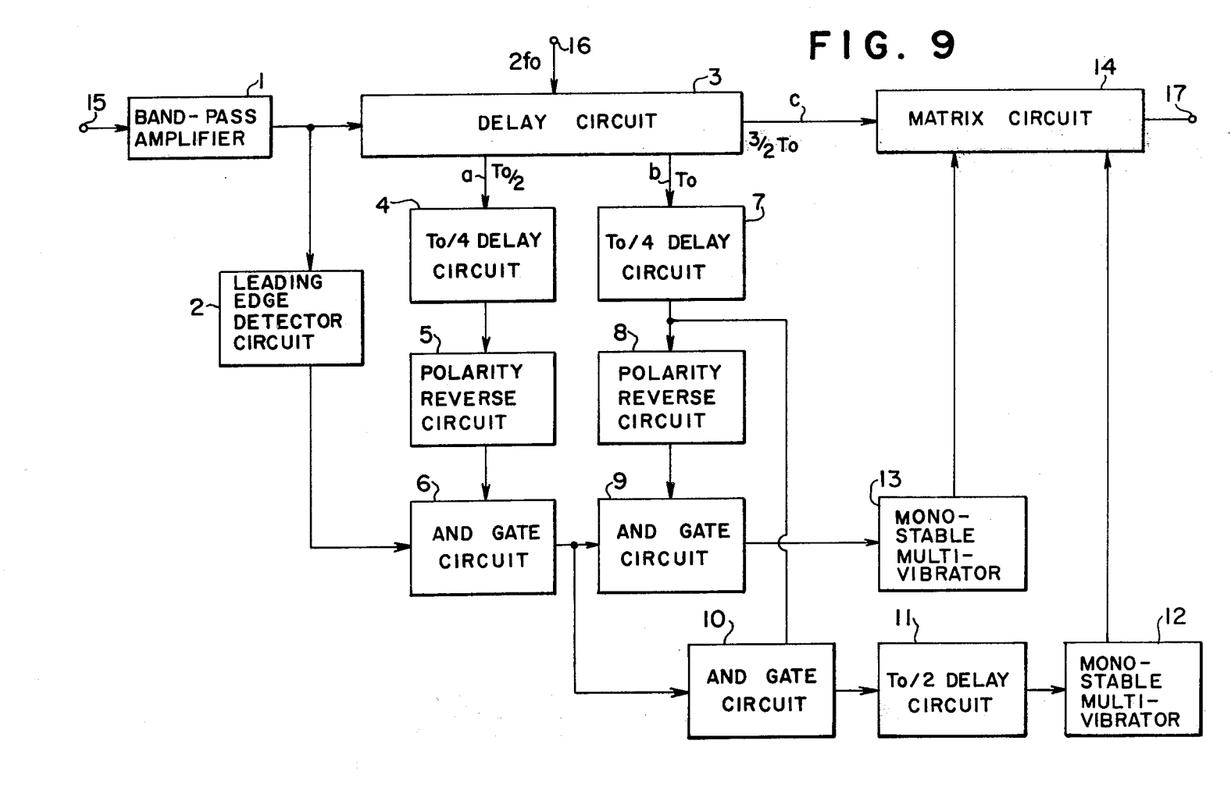
FIG. 9 is a block diagram of an apparatus of the invention as applied to the signal modulated according to the MPM system.
Figure 10:
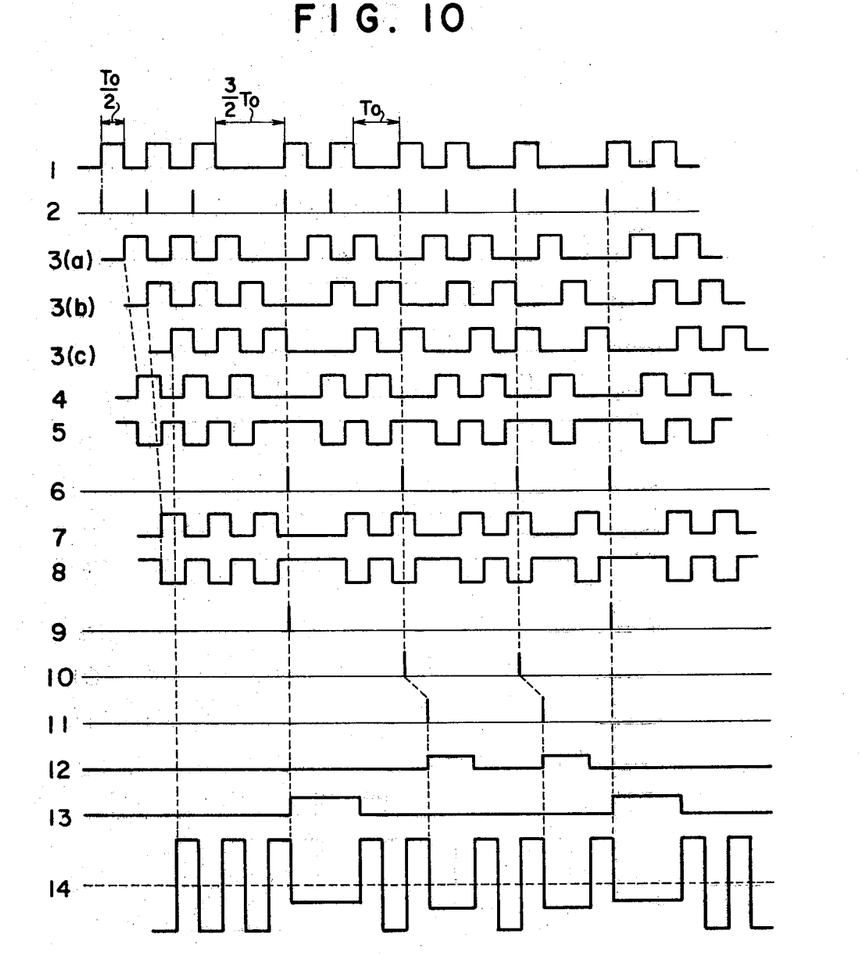
FIG. 10 shows a series of waveforms of various signals appearing in the apparatus of FIG. 9.

Referring to FIG. 9, there is shown another embodiment of the invention as applied to a signal modulated according to MPM scheme. Various signals appearing at the output of circuit elements of the apparatus are shown in FIG. 10 and designated by corresponding reference characters.

A signal propagating through a transmission system or a MPM modulated digital signal which is reproduced from a record medium is applied to terminal 15 and thence to bandpass amplifier 1 which eliminates noise components. Subsequently, the signal is fed to a rising end detector 2 and delay circuit 3. The detector 2 produces a pulse indicative of the rising end of a pulse contained in the original signal. Delay circuit 3 comprises a shift register which is fed with a shift pulse having a frequency of $2f_0$ from terminal 16, and produces delayed signals on lines a, b and c, which are delayed by $\frac{1}{2}T_0$, $T_0$ and $3/2T_0$, respectively. The signal from delay circuit 3 which is delayed by $\frac{1}{2}T_0$ is fed through another delay circuit 4 which applies a further delay of about $\frac{1}{4}T_0$ thereto. The signal is then passed through polarity inversion circuit 5 to have its polarity inverted. The output signals from circuits 2 and 5 are applied to AND gate 6, which produces a pulse containing pulse position information for negative pulses contained in the original signal and having pulse widths of $T_0$ and $3/2T_0$. To achieve a discrimination between the pulse widths $T_0$ and $3/2T_0$, the signal from delay circuit 3 which is delayed by $T_0$ is further delayed by about $\frac{1}{4}T_0$ by delay circuit 7 in the similar manner as mentioned previously. The resulting delayed signal and the output pulse from gate 6 are applied to AND gate 10, which produces a pulse containing pulse position information for a negative pulse contained in the original signal and having a pulse width of $T_0$. On the other hand, the output signal from delay circuit 7 is inverted in polarity by polarity inversion circuit 8, and the inverted output is applied together with the output pulse from gate 6, to AND gate 9, which produces a pulse containing pulse position information for a pulse contained in the original signal and having a pulse width of $3/2T_0$.

The output pulse from gate 9 triggers a monostable multivibrator 13, which then produces a correction pulse having a pulse width of $3/2T_0$. A pulse produced by gate 10 and containing pulse position information for a pulse having a pulse width of $T_0$ is delayed by $\frac{1}{2}T_0$ by delay circuit 11 and is then applied to a monostable multivibrator 12 for triggering it. Thereupon, a correction pulse is produced having a pulse width of $T_0$. These correction pulses are applied to matrix circuit 14 together with the original signal which is delayed by $3/2T_0$ in order to adjust the timing. The matrix circuit effects an algebraic addition and provides an output signal which appears at terminal 17. As indicated at 14 in FIG. 10, there is obtained a signal having a zero average or an average having no fluctuation when the correction pulses for $T_0$ and $3/2T_0$ are compressed in their amplitude to $\frac{1}{2}$ and $\frac{2}{3}$, respectively, relative to the original amplitude of the zero level of the original signal or when they are compressed to $\frac{1}{4}$ and $\frac{1}{3}$, respectively, relative to the entire amplitude across the pulse top and the pulse bottom of the original signal. It is to be noted that the output signal 14 shown in FIG. 10 is depicted in stretched form relative to the amplitude of signals shown at 1 to 13 in this Figure. The use of the amplitudes of the correction pulses which are $\frac{1}{2}$ and $\frac{2}{3}$ times the original amplitude is a theoretical design, and in the practical arrangement, the distortions occurring in the transmission system or the non-linear response of the reproducing mechanism such as pickup must be considered. Consequently, the ratio at which the three signals are added together in the matrix circuit 14 is chosen depending on the practical considerations.

In the embodiment shown in FIG. 9, the pulse width of the negative pulse is determined on the basis of the rising end of the positive pulse and estimating the next rising end of the pulse. However, the pulse width of the negative pulse can be determined on the basis of the falling end of positive pulse and estimating the rising end of the next pulse. A pulse having the pulse width $\frac{1}{2}T_0$ has been chosen as a reference in order to adjust the amplitude of other negative pulses having pulse widths of $T_0$ and $3/2T_0$. However, the pulse which is chosen as a reference may have any one of these pulse widths.

For the convenience of description, the expressions "the rising end of pulse" and "the falling end of pulse" or equivalently "the leading edge" and "trailing edge" are used in the sense that "the rising end of pulse" refers to a position on the time axis where the pulse top starts or where the pulse bottom ends while "the falling end of pulse" refers to a position on the time axis where the pulse top ends or where the pulse bottom begins.

What is claimed is:

1. A system for regulating an average of amplitudes of a digital signal comprising a train of pulses formed by pulse tops and pulse bottoms which are equally spaced by a given amplitude from a reference level, at least one of the pulse top and the pulse bottom being a pulse variety which is of more than two different pulse widths; the system comprising means for detecting at least the presence of pulses of the pulse variety having a selected one of the pulse widths, means for producing correction pulses having a pulse width which is equal to said selected pulse width in response to the output of the detecting means, and means for algebraically adding the correction pulses with said pulses of the digital signal having the selected pulse width.

2. A system according to claim 1 in which the digital signal comprises a signal which is modulated according to a modified frequency modulation (MFM) system and in which the pulse top and the pulse bottom are each of three different pulse widths of $T_0$, $3/2T_0$ and $2T_0$ where $T_0$ represents the period of a clock pulse and wherein the pulse tops and pulse bottoms are equally spaced by a given amplitude from a reference level, and wherein said detecting means detects pulses of the pulse variety which have the pulse widths of $3/2T_0$ and $2T_0$, and said producing means produce correction pulses having amplitudes which are equal to one-third and one-half the given amplitude, and said adding means add the correction pulse having the one-third amplitude to a pulse of the pulse variety which has a pulse width of $3/2T_0$ and adds the correction pulse having one-half amplitude to a pulse of the pulse variety which has a pulse width of $\frac{1}{2}T_0$.

3. A system according to claim 1 in which the digital signal comprises a signal which is modulated according to a modified phase modulation (MPM) system and in which the pulse top has a constant pulse width of $\frac{1}{2}T_0$ while the pulse bottom has three different pulse widths of $\frac{1}{2}T_0$, $T_0$ and $3/2T_0$ where $T_0$ represents the period of a clock pulse and wherein the pulse tops and pulse bottoms are equally spaced by a given amplitude from a reference level, and wherein the detecting means detect those pulse bottoms which have pulse widths of $T_0$ and $3/2T_0$, the producing means produce correction pulses having amplitudes which are one-half and two-thirds the given amplitude, and the adding means add the correction pulse having the one-half amplitude to a pulse bottom which has a pulse width of $T_0$ and adds the correction pulse having the two-thirds amplitude to a pulse bottom which has a pulse width of $3/2T_0$.

4. A system according to claim 1 in which the digital signal comprises a signal which is modulated to a modified frequency modulation (MFM) system and in which the pulse top and the pulse bottom are each of three different pulse widths of $T_0$, $3/2T_0$ and $2T_0$ where $T_0$ represents the period of a clock pulse and wherein the pulse tops and pulse bottoms are equally spaced by a given amplitude from a reference level, and wherein the detecting means includes first circuit means for detecting the pulse tops having pulse widths of $3/2T_0$ and $2T_0$, and second circuit means for detecting the pulse bottoms having the pulse widths of $3/2T_0$ and $2T_0$, the first circuit means comprising means for producing a first train of position pulses indicative of the positions where the individual pulse tops of the pulse train end, a first gate receiving the first train of position pulses and detecting those first position pulses which correspond to the ending position of the pulse tops having the pulse width of $3/2T_0$, a first delay circuit for delaying the output of the first gate by $\frac{1}{2}T_0$, and a second gate receiving the first train of position pulses and detecting those first position pulses which correspond to the ending position of the pulse tops having the pulse width of $2T_0$, the second circuit means comprising means for producing a second train of position pulses indicative of the positions where the individual pulse bottoms of the pulse train end, a third gate receiving the second train of position pulses and detecting those second position pulses which correspond to the ending position of the pulse bottoms having the pulse width of $3/2T_0$, a second delay circuit for delaying the output of the third gate by $\frac{1}{2}T_0$, and a fourth gate receiving the second train of position pulses and detecting those second position pulses which correspond to the ending position of the pulse width of $2T_0$, and wherein said means for producing the correction pulses comprises a first and a second monostable multivibrator for producing correction pulses having a pulse width of $3/2T_0$ in response to the outputs of the first and the second delay circuits, and a third and a fourth monostable multivibrator for producing correction pulses having a pulse width of $2T_0$ in response to the outputs of the second and the fourth gate, and wherein said adding means comprises a delay circuit which delays the original pulse train by $2T_0$, and a matrix circuit for algebraically adding the outputs of the monostable multivibrators, with predetermined polarities, to the outputs of the delay circuit.

5. A system according to claim 1 in which the digital signal comprises a signal which is modulated according to a modified frequency modulation (MFM) system and in which the pulse top and the pulse bottom are each of three different pulse widths of $T_0$, $3/2T_0$ and $2T_0$ where $T_0$ represents the period of a clock pulse and wherein the pulse tops and pulse bottoms are equally spaced by a given amplitude from a reference level, and wherein the detecting means comprises means for producing a combined train of position pulses including first position pulses indicative of the ending position of the pulse tops of the pulse train and second position pulses indicative of the ending position of the pulse bottoms, a first primary gate receiving the combined train of position pulses and detecting those first position pulses which correspond to the ending position of the pulse tops having a pulse width of $3/2T_0$ and those second position pulses which correspond to the ending position of the pulse bottoms having a pulse width of $3/2T_0$, a second primary gate receiving the combined train of position pulses and detecting those first position pulses which correspond to the ending position of the pulse tops having a pulse width of $2T_0$ and those second position pulses which correspond to the ending position of the pulse bottoms having a pulse width of $2T_0$, a first delay circuit for delaying the output of the first primary gate by $\frac{1}{2}T_0$, a first auxiliary gate for detecting those first position pulses which correspond to the ending position of the pulse tops having a pulse width of about $3/2T_0$ in response to the output of the first delay circuit, a second auxiliary gate for detecting those second position pulses which correspond to the ending position of the pulse bottoms having a pulse width of $3/2T_0$ in response to the output of the first delay circuit, a third auxiliary gate for detecting those first position pulses which correspond to the ending position of the pulse tops having a pulse width of $2T_0$ in response to the output of the second primary gate, and a fourth auxiliary gate for detecting those second position pulses which correspond to the ending position of the pulse bottoms having a pulse width of $2T_0$ in response to the output of the second primary gate, and wherein said means for producing the correction pulses comprise a first and a second monostable multivibrator for producing correction pulses having a pulse width of $3/2T_0$ in response to the outputs of the first and the second auxiliary gate, and a third and a fourth monostable multivibrator for producing correction pulses having a pulse width of $2T_0$ in response to the outputs of the third and the fourth auxiliary gate, and wherein said adding means comprises a second delay circuit which delays the original pulse train by $2T_0$, and a matrix circuit for algebraically adding the outputs of the monostable multivibrators, with predetermined polarities, to the outputs of the second delay circuit.

6. A system according to claim 1 in which the digital signal comprises a signal which is modulated according to a modified phase modulation (MPM) system and in which the pulse top has a constant pulse width of $\frac{1}{2}T_0$ while the pulse bottom has three different pulse widths of $\frac{1}{2}T_0$, $T_0$ and $3/2T_0$ where $T_0$ represents the period of a clock pulse and wherein the pulse tops and pulse bottoms are equally spaced by a given amplitude from a reference level, and wherein said detecting means comprises means for producing a train of position pulses indicative of the ending position of the pulse bottoms of the original pulse train, a first gate receiving the train of position pulses and detecting those position pulses which correspond to the ending position of the pulse bottoms having a pulse width of $T_0$, a first delay circuit for delaying the output of the first gate by $\frac{1}{2}T_0$, and a second gate receiving the train of position pulses and detecting those position pulses which correspond to the ending position of the pulse bottoms having a pulse width of $3/2T_0$, wherein said means for producing the correction pulses comprises a first and a second monostable multivibrator for producing correction pulses having pulse widths of $T_0$ and $3/2T_0$ in response to the output of the first circuit and the output of the second gate, and wherein said adding means comprises a second delay circuit which delays the original pulse train by $3/2T_0$, and a matrix circuit for algebraically adding the outputs of the monostable multivibrators to the output of the second delay circuit.

7. A system according to claim 1, wherein said means for producing correction pulses is effective for producing correction pulses having amplitudes such that when the correction pulses are added to the pulses of the digital signal the average amplitude of the sum of the digital signal and the correction pulses remains substantially constant.

* * * * *